Patented Nov. 21, 1922.

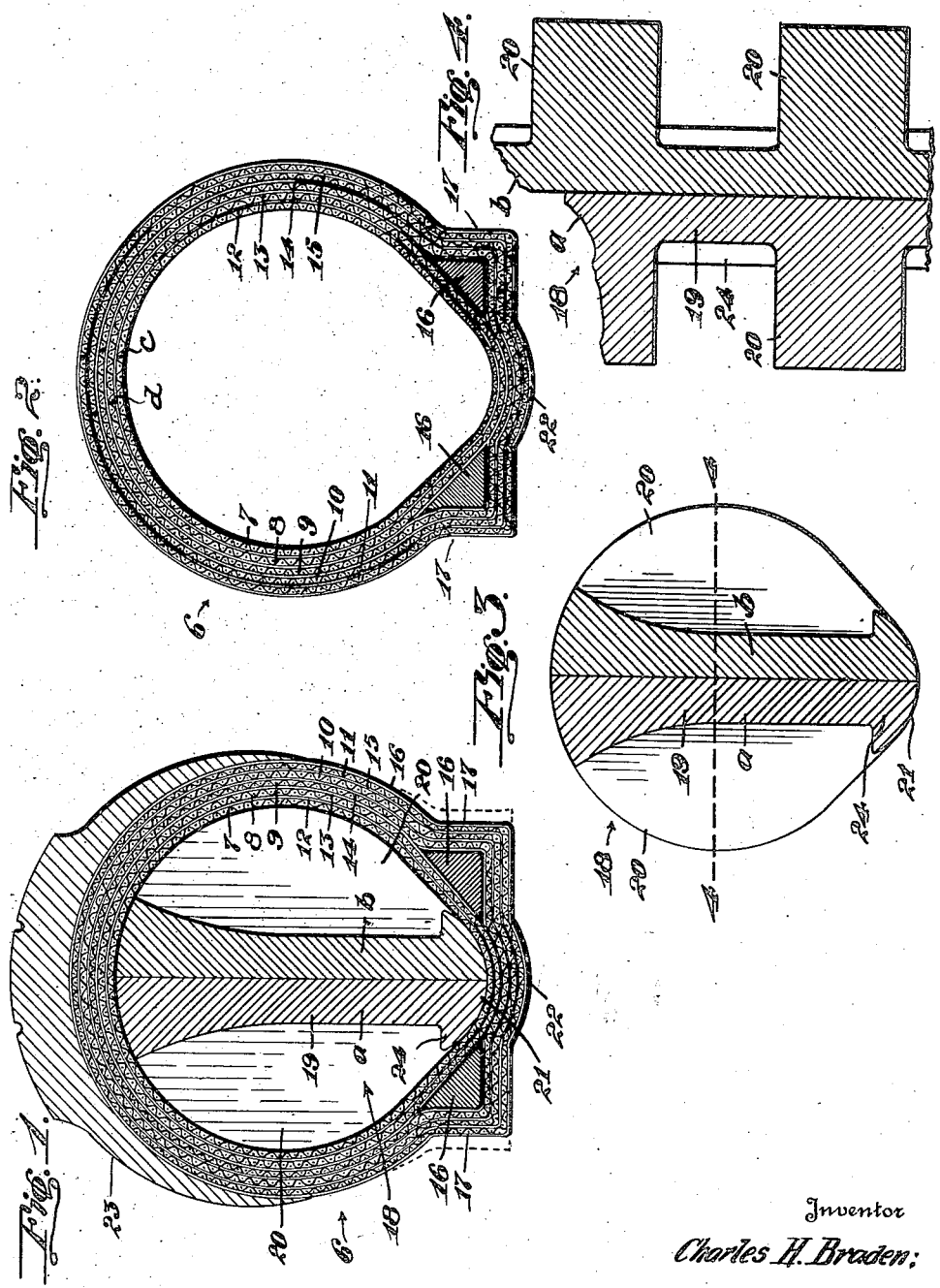

1,436,146

UNITED STATES PATENT OFFICE.

CHARLES H. BRADEN, OF LOS ANGELES, CALIFORNIA.

AIRLESS TIRE.

Application filed January 17, 1921. Serial No. 437,758.

*To all whom it may concern:*

Be it known that I, CHARLES H. BRADEN, a citizen of the United States, residing at Los Angeles, in the county of Los Angeles and State of California, have invented new and useful Improvements in Airless Tires, of which the following is a specification.

This invention relates to vehicle tires, and particularly pertains to non-inflated vehicle tires and to the manner of constructing and assembling the same.

An object of this invention is to provide a construction in airless tires of the well known type embodying a resilient core or filler usually consisting of an annular central wall having trusses or bridges spaced apart at frequent intervals throughout the opposite sides thereof for supporting an outer carcass or casing, by which separation or pulling apart of the casing along the inner periphery of the filler and casing will be obviated.

In tires of this character as ordinarily constructed a tubular casing is formed with a divided inner periphery through which the resilient core is inserted, the casing being provided with annular beads or flanges on each side of the divided portion. It has been found in practice that strains on tires of this kind preclude there being designed with straight sides as the divided inner portion of the casing separates from the resilient core; and also does not sufficiently grip the wheel rim to securely hold the tire in place and even where the tire is provided with beads engaged by flanges on the wheel rim the relative lateral movement permitted between the beads by reason of the divided inner periphery of the casing operates to separate the beads from the filler; and also operates against secure engagement of the tire on the rim. By forming the tire with a closed inner periphery and a distended portion at said periphery in accordance with the present invention the objectionable features above mentioned are overcome.

Another object is to provide such a tire that is adapted to be used on standard types of rims such as are used for pneumatic tires, whether straight side or clinched, and which will adhere to these rims in the proper manner without requiring auxilliary means for securing the tire to the rim.

Another object is to provide a tire with the above objects in view that is adapted to economical manufacture.

A further object is to provide an economical method of constructing or building up the tire with standard tire materials in such a manner that the fabric and structure of the materials used is distributed relative to the usual stresses encountered in tires as to provide even wear and therefore long life.

The internal pressures used in pneumatic tires cause the side wall of the tire to tend to protrude outward and force themselves against the tire rim, thus holding the tire rigidly in position on the rim, no other means of securing the tire being required. Since non-inflated tires ordinarily have no internal pressures to force the walls against the rim to secure them thereto, other means must be provided to secure such types of tires. It is one of the objects of this invention to cause the normal tension of the tire and the weight of the vehicle to accomplish this purpose without in any way increasing the cost of the tire by a construction which will add to the strength and life of the tire.

Other objects will appear hereinafter.

The invention is illustrated in the accompanying drawings, in which:—

Figure 1 is a view in section of a tire embodying the features of and built in accordance with the invention.

Figure 2 is a view in section illustrating the manner of constructing the outer casing.

Figure 3 is a view in transverse section of the core.

Figure 4 is a detail horizontal section as seen on the line 4—4 of Figure 3.

More specifically, 6 indicates the tubular outer casing of the tire which may be built up of any suitable number of layers of tire material, but is here shown as consisting of a series of layers of fabric 7, 8, 9, 10, and 11 with layers of rubber, 12, 13, 14, and 15 interposed therebetween and the whole vulcanized together to form a practically homogeneous mass. Reinforcing beads 16 are interposed between the second and third layers 8 and 9 and extend entirely around the casing on each side of its inner periphery and are preferably shaped to form straight sides 17. An annular core 18 is placed within the casing to provide the necessary resiliency and body to the tire and serves to hold the casing in shape as well as to support the weight of the vehicle upon which the tires are used. This core is shown as formed of two similar half sections *a* and *b* joined together to provide an annular central wall 19; portions of the core being extended at intervals on opposite sides thereof to form ribs or trusses 20 which project to and are engaged at their outer edges with the inner surface of the casing, these ribs and the partition having a combined vertical section corresponding to that of the interior of the casing. This core, however, may be built up in any other desired manner, such as by laying strips of rubber in laminated arrangement circumferentially around a drum mold and vulcanizing the whole into a single integral structure. The inner periphery of the core is formed with an arciform projection 21 of smaller radius around which the layers of the casing are passed to form an annular ridge 22 upon the inner perimeter of the tire intermediate the sides thereof. This ridge constitutes one of the salient features of this invention and provides a means for causing the sides of the tire to frictionally engage a straight side tire rim as will later appear.

In constructing the tire, a mould or form is used about which the successive layers of fabric and rubber are built up to form the casing. The first layer of fabric 7 is laid upon the mould so that the sides thereof meet at the upper part of the form at a point to one side of the vertical center line as indicated at *c* in Figure 2. The next layer is then placed about the mould in a similar manner but the sides thereof meet on the opposite side of the center line as indicated at *d* in Figure 2, thus providing interlocking ends, this being repeated with the successive layers so that the edges of adjacent layers will be laminated with respect to each other. The carcass thus formed is then partly cured to retain it in shape; the laminated edges being separated so that the casing will be divided only on its outer periphery and when removed from the form or mould the core 18 is placed within the casing, the side portions of which may be spread apart along the divided outer periphery of the casing to receive the core. After the core is put in place the layers of fabric are joined together and the tread 23 is placed in position whereupon the whole is vulcanized together to form a practically homogeneous tire; the tread 23 serving to span the seam on the casing and to aid in securing all parts of the tire together.

It will be observed that a tire thus formed constitutes a one piece tire with the core completely enclosed in the casing and with a substantial body of fabric extending transversely across the inner periphery of the core and up the sides thereof, thus insuring against the tire being split or pulled apart along its inner periphery.

As a means for insuring a substantial connection between the inner periphery of the core and the casing, the wall 19 is enlarged at its inner edge as indicated at 24.

When a rim is expanded into position on the tire the ridge 22 is flattened which causes the sides of the tire to distend slightly as indicated in dotted lines in Figure 1, so as to tightly engage the sides of the rim. The normal tension of the tire on the rim added to the weight of the vehicle serves to retain the tire rigidly in place on the rim. The inner surfaces of the tire are thus always in contact with the rim on which the tire is mounted. The weight of the vehicle and the other forces to which the tire is subjected cause a compression force directly through the center wall of the core, these forces being gradually dissipated through the immediate structure of the core and the necessary support to this core is provided by the rim on which the tire is mounted; the core bearing directly upon the underlying layers of the casing which in turn are held in position against the rim. These layers it will be observed are therefore not subject to any material tension strains and there is therefore little or no tendency for the fabric to shear at these points.

Whereas, I have shown interlocking ends to the shoe I may use any type of joint at the upper perimeter of the shoe, and whereas, I have shown a specific arrangement of materials I do not wish to be confined thereto but may employ such construction as come within the scope of the appended claims, and while I have shown this invention as applied to a straight side tire it is apparent that it is also adapted to the ordinary beaded tire.

I claim:

1. In a vehicle tire, a resilient annular core, and layers of tire material completely encircling said core; said core being formed at its inner perimeter to cause the said layers to form an annular ridge on the inner perimeter of the tire.

2. A vehicle tire comprising a resilient annular core, a casing encompassing said core, and a fabric ridge formed on the inner perimeter of said casing in the plane of the center of the core.

3. A tire comprising a core formed with an annular central wall and a series of spaced transversely extending ribs on each side of said wall forming air spaces therebetween, and a casing enclosing said core having a series of fabric layers extending across the inner periphery of the core, said fabric layers forming a ridge on the inner periphery of the tire in the plane of the central wall of the core.

4. A tire comprising a core formed with an annular central wall and a series of spaced transversely extending ribs on each side of said wall forming air spaces therebetween, and a casing enclosing said core having a series of fabric layers extending transversely across the inner periphery of the core around each side of the core and joined at the outer circumference of the tire; said casing being formed with a fabric ridge on its inner periphery in the plane of the central wall of the core, said casing being vulcanized to the core throughout the inner and outer peripheries thereof and along the edges of the ribs.

5. A tire comprising a core formed with an annular central wall and a series of spaced transversely extending ribs on each side of said wall forming air spaces therebetween, a casing enclosing said core having a series of fabric layers extending transversely across the inner periphery of the core around each side of the core and joined at the outer circumference of the tire, said casing being formed with a fabric ridge on its inner periphery in the plane of the central wall of the core, and a tread shoe circumferentially encircling said casing over the joint of the fabric layers.

CHARLES H. BRADEN.